United States Patent Office 3,153,370
Patented Oct. 20, 1964

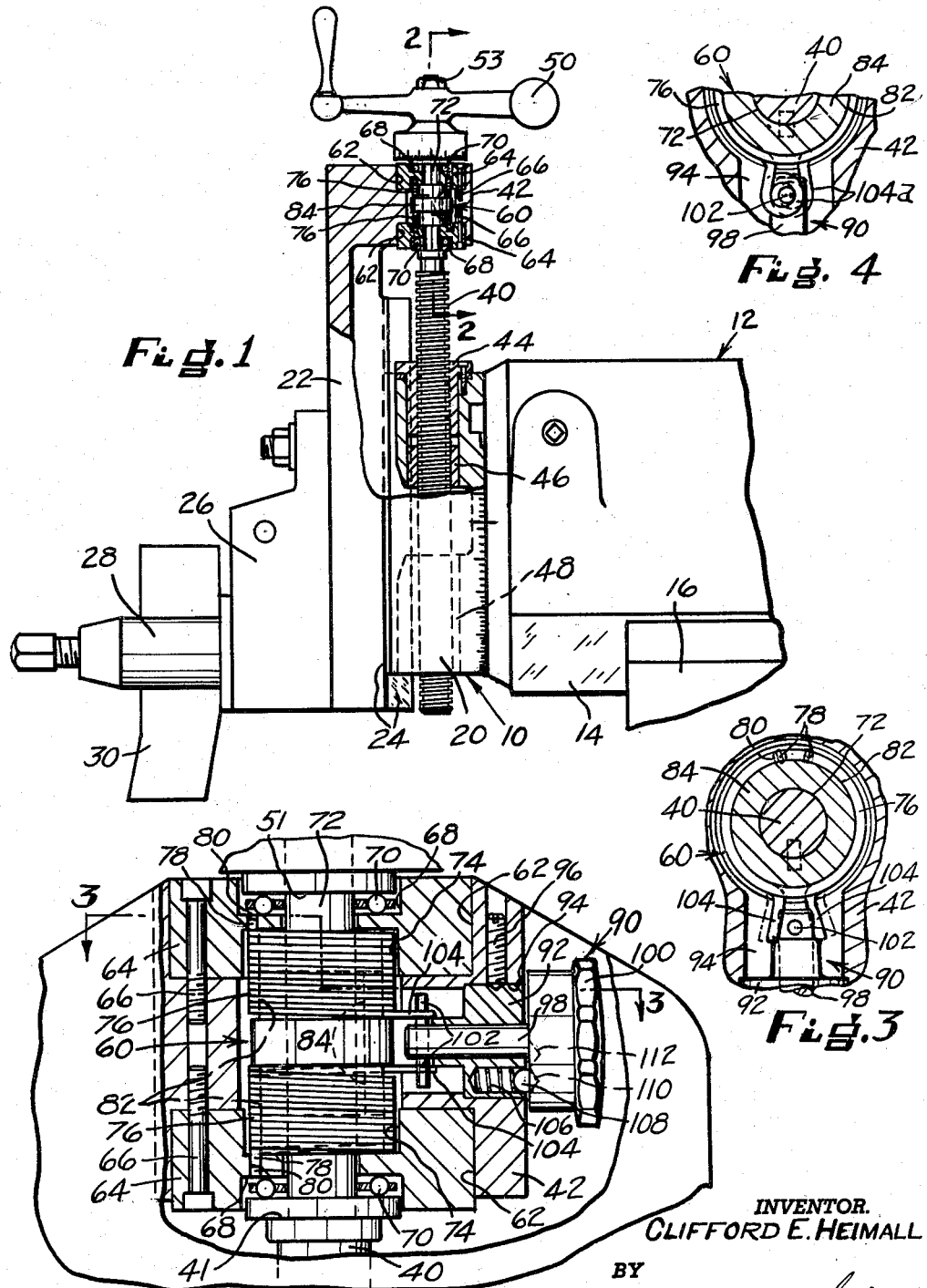

3,153,370
TOOL SLIDE RESTRAINING MEANS
Clifford E. Heimall, Berlin, Mass., assignor to Norton Company, Worcester, Mass., a corporation of Massachusetts
Filed Sept. 19, 1960, Ser. No. 56,913
4 Claims. (Cl. 90—52)

The invention relates to improvements in machine tools such as shapers and particularly to a tool slide restraining means for the tool head supported by the ram of a shaper.

In a typical shaper, the tool head supports the cutting tool which is fixed to a tool slide mounted thereon, and is located at the forward end of the ram. The tool head consists of a plurality of relatively movable elements, one of which is the tool slide adjustably poistioned on the tool head in slidable engagement therewith. A shaft assembly including a feed screw portion is rotatably mounted within but axially fixed to, and moves with the tool slide. Engaging the feed screw portion is a nut fixed to the tool head so that rotation of the shaft assembly including a feed screw portion moves the cutting tool, the tool slide, and the shaft assembly collectively as a unit.

During the cutting action of the cutting tool as it travels across a work piece mounted on a shaper, the cutting tool is usually subjected to a substantial load as well as to vibrations which tend to cause the tool slide supporting the cutting tool to creep relative to the tool head, so that the setting or adjustment of the cutting tool relative to the work piece tends to change during the course of the cutting operation. In order to preclude such undesirable changes in the setting or adjustment of the cutting tool, the tool head is customarily equipped with a means such as a manually actuated frictional clamp for securing the tool slide against displacement relative to the tool head. For example, the clamping means used for this purpose may consist of a set screw or other screw driven mechanism supported by the tool head and arranged to frictionally engage one of the elements movable with the tool slide. However, no single one of the various frictional clamping means used to date has been fully successful in preventing creep or other displacement of the tool slide relative to the tool head, especially in applications where a heavy cut is required. In addition, in some applications, and particularly with machines not equipped with an automatic feeding mechanism for the tool, the operator is required to feed the tool toward the work piece after each stroke of the ram. Therefore, the practical choice of frictional clamping means has been restricted to those which may be released readily so they do not interfere with manual feed of the cutting tool by intermittent displacement of the tool slide on which it is supported. Recognizing the serious limitations of the various known types of restraining means for the tool slide and keeping in mind the requirements for such restraining means as applied particularly to shapers, the instant invention provides a readily operable means for securing a tool slide against creep by restraining the shaft assembly rotatable to position the tool slide, against such rotation. The instant invention also contemplates a shaft restraining means readily releasable to permit rotation of the shaft when desired. Thus, the device comprising the instant invention facilitates the preparation of accurately dimensioned work pieces and minimizes the risk of machining operations so inaccurate that the work piece has to be reworked or scrapped.

It is therefore the primary object of this invention to provide a means whereby the tool slide and the cutting tool it supports are secured or restrained against movement and are thus maintained in the desired position relative to the work piece.

Another object is to provide an anti-creep mechanism for a machine tool slide movable by a feed screw, rotatable member or shaft.

Another object is to provide a device that secures a feed screw or shaft against rotation in either direction.

Another object is to provide an anti-rotational device that can be released easily when adjustment of a rotatable member is desired.

Another object is to provide a releasable device constructed so that it is normally effective to frictionally engage, grip and secure a feed screw or shaft against rotation.

A still further object is to provide a mechanism for restraining a shaft against rotation that will increase its securing or gripping power upon a shaft when an effort is made to rotate said shaft in either direction.

Other objects and advantages will become apparent upon consideration of the following description in connection with the annexed drawings showing the preferred embodiment of the invention in which like reference characters denote like or corresponding parts throughout all the views wherein:

FIG. 1 is a side elevation, partially broken away, of the tool holder assembly and the front end of the ram of a shaper, FIG. 2 is a vertical section taken on the line 2—2 of FIG. 1 illustrating various details of the preferred embodiment of the instant invention, FIG. 3 is a horizontal section taken substantially on line 3—3 of FIG. 2 illustrating additional details of the relationship between various elements of the device comprising the preferred embodiment of the instant invention, and FIG. 4 is a horizontal sectional view corresponding to FIG. 3, but illustrating details of an alternative embodiment of the instant invention.

Referring now to the drawings illustrating portions of a conventional shaper embodying in the instant invention, a tool head 10 is mounted in the conventional manner upon the end of a ram 12 having a slide 14, mounted for reciprocation in a mating slideway of a base 16 of a conventional shaper. Reference may be made to Patent No. 2,090,506 to W. F. Zimmerman for details not disclosed herein of a conventional shaper and tool head therefor, since the tool head shown therein is similar to the tool head 10 which will now be described.

The tool head 10 comprises tool slide base 20 which supports a tool slide 22, slidable on a slideway 24 of the tool slide base 20. An adjustable clapper box 26 is mounted on the tool slide 22 and pivotally supports a tool post 28 for mounting a cutting tool 30 in the conventional manner.

A rotatable member comprising feed screw 40 mounted within an extended portion 42 at one end of the tool slide 22 and axially constrained against longitudinal movement relative to the tool slide 22, engages a nut 44 fixed to the tool slide base 20 and is slidably and rotatably supported within bearings 46 and 48 fixed to the tool slide base 20. When the feed screw 40 is rotated by a hand crank 50 fixed to it, the tool slide 22, the cutting tool 30 and the feed screw 40 itself are simultaneously traversed along the slideway 24 of the tool slide base 20, with the feed screw 40 rotating within and traversing the bearings 46 and 48.

A securing or restraining device generally designated by the reference numeral 60 is provided and arranged as shown in the accompanying drawings to prevent creep of the tool slide 22 due to forces exerted on the cutting tool 30 during cutting operations and to the vibrations to which the tool head assembly is subjected during these operations. In order to accomplish this purpose, the restraining device 60 is positioned within the tool slide 20 to engage and restrain the feed screw 40 against rotation. The restraining device 60 is arranged to be moved selectively between a first position in which the feed screw 40 is free to rotate and a second position in which the feed screw 40 is restrained against rotation to maintain the tool slide 20 and the cutting tool 30 supported thereby in the desired position relative to the work piece throughout a given cutting operation.

The extended portion 42 of the slide 22 houses the securing or restraining device 60 and has two spaced opposed bores 62 in which bushings 64 are fixedly mounted by screws 66. Each bushing 64 has an annular recess 68, the bottom of which engages one of a pair of spaced opposed thrust bearings 70 mounted on a reduced portion 72 of the feed screw 40. Since the respective thrust bearings 70 are positioned between and in bearing engagement with a shoulder 41 adjacent the threaded portion of the feed screw 40 and a surface 51 of the hand crank 50 secured to the feed screw 40 by a nut 53, they serve to maintain feed screw 40 in fixed longitudinal relation to tool slide 22 while permitting feed screw 40 to rotate freely relative to the tool slide 22.

Opposite the bore 68 of each of the bushings 64 is an annular recess 74 which houses a portion of a tightly wound coiled spring or member 76. One end of each coiled member 76 has an anchoring portion 78 projecting into a hole 80 in each of the bushings 64. This provides an anchor so that each coiled spring or member 76 is held against rotation and may be unwound or expanded radially to release its hold or grip on the feed screw 40 by engaging and rotating a projecting portion 104 at the free end of the coiled member 76. The normal inner diameter of the coiled member 76 is smaller than and is expanded to surround and frictionally engage and grip the outer diameter of one of two opposed spaced reduced portions 82 of a collar 84 either integral with or keyed to the reduced portion 72 of the feed screw 40 as shown. Each of the coiled members 76 is contained between the bottom of the recess 74 in one of the bushings 64 and the adjacent shoulder on the collar 84.

Since the coiled members 76, secured to the fixed bushings 64 by their respective anchoring portions 78, are normally wound so that their inside diameter is smaller than the diameter of the surfaces they engage, they must be expanded to fit over the surfaces of the reduced portions 82 of the collar 84. Accordingly, when they are released, they are self-biased so that they tend to wind up and thus exert the necessary predetermined pressure to frictionally restrain the collar 84 and the feed screw 40 to which it is secured from rotating, and any effort or attempt to rotate the feed screw 40 increases the gripping power of one of the self-biased coiled members 76 upon the reduced portion 82 of the collar 84 keyed to the feed screw 40. Thus, the coiled members 76 are so arranged that they are collectively effective to secure the feed screw 40 against rotation in either direction, one coiled member 76 being effective against rotation in one direction and the other being effective against rotation in the opposite direction. Therefore, it should be apparent that a releasable restraining means has been provided which selectively restrains a shaft against rotation. Moreover, this restraining means may be arranged to perform this function in applications other than that illustrated in the preferred embodiment described and shown herein wherever such restraining action is required for a rotatable member.

A releasing mechanism or means 90 is provided to unwind or radially expand the coiled members 76 to release their grip upon the rotatable member comprising feed screw 40 so that it may be rotated to traverse or move the tool slide 22 relative to the tool slide base 20. The releasing means comprises a housing 92 fixed within a bore 94 in the extended portion 42 of tool slide 22 by a set screw 96, and rotatably supporting a shaft 98 having a knob 100 at one end and a transverse pin 102 fixed to its other end.

The pin 102 extends diametrically of and projects from both sides of the shaft 98 and is positioned in a mid plane between projecting portions 104 of the respective coiled members 76, said projecting portions 104 being located at the opposite free ends of the coiled members 76 from the anchored bent portions 78 thereof. The projecting portion 104 of one of the coiled members 76 is positioned to the left of the upper portion of the pin 102 and the other projecting portion 104 is located to the right of the lower portion of the pin 102 as viewed from the right hand side of the assembly illustrated in FIG. 2.

A releasing mechanism retaining means comprising a spring 106 and a ball detent 108 is located within a bore in the housing 92. The spring 106 forces the ball 108 into a recess 110 in the knob 100 to maintain the releasing device or mechanism in the securing or restraining position shown in the drawings.

When it is desired to release the restraining device 60 and rotate the feed screw 40 for adjusting or feeding the tool slide 22 and cutting tool 30, the knob 100 is rotated counter-clockwise as viewed from the right hand side of the arrangement illustrated in FIG. 2, so that the pin 102 engages the projecting portions 104 of each coiled member 76, radially expanding or unwinding the coiled members so as to enlarge the inner diameter of the coiled members or springs 76, releasing their hold or grip on the collar 84 keyed to the feed screw 40. The knob 100 is rotated until a recess 112 in knob 100 is engaged by the ball 108 when it is desired to maintain the restraining device 60 in a released position.

In the course of normal operation of a shaper embodying the instant invention, the knob 100 is rotated to the position in which the restraining device 60 is disposed so that the feed screw 40 may be rotated by manipulation of the hand crank 50. Thereafter, the operator rotates hand crank 50 to turn the feed screw 40 in the fixed nut 44 and thereby position the tool slide 22 and the tool 30 supported thereby in the desired location relative to the tool slide base 20 and thence relative to the work piece. If the cutting operation to be undertaken will involve feeding the tool slide 22 relative to the tool slide base 20 by rotation of the feed screw 40, the knob 100 is left in the position in which the restraining device 60 is disposed so that the feed screw 40 is free to rotate. On the other hand, if the cutting operation is one in which the cutting tool 30 must be maintained in the precise position in which it has been located, the knob 100 is rotated in the opposite direction so that the restraining device 60 engages the feed screw 40 to prevent its rotation and thereby preclude creep or other inadvertent displacement of the tool slide 22. When such a cutting operation is completed, the knob 100 is once again manipulated to release the feed screw 40 in order to permit the operator to reset the position of the cutting tool 30.

In the alternative embodiment of the instant invention illustrated in FIG. 4, the projecting portions 104a of the respective coiled members 76 are shaped to encircle the respective ends of the pin 102, as illustrated in FIG. 4, in order to insure positive displacement of the projecting portions 104a of the respective coiled members 76 when the pin 102 is rotated in either direction by manipulation of the knob 100. In this configuration the natural tendency of the coiled members 76 to wind up on and thus frictionally engage the reduced portions 82 of the collar 84 is augmented by the force exerted on the projecting portions 104a by rotation of the pin 102.

The arrangement illustrated in FIG. 4 is illustrative only. Hence, it is to be understood that this alternative embodiment of the instant invention contemplates other structural configurations capable of performing the same function such as a disc secured to the inner end of shaft 98 provided with a pair of relatively enlarged diametrically opposed openings to receive the respective projecting portions 104 or a relatively enlarged pin substituted for pin 102 and provided with slotted end portions of a size and shape suitable to receive and retain the respective projecting portions 104 as the knob 100 is rotated between its first and second positions.

While the embodiment of the instant invention described above and illustrated in the accompanying drawings illustrates one suitable application of this invention, it is to be understood that this embodiment is illustrative only and that various structural modifications and variations of this invention are contemplated within the scope of the claims appended hereto.

What is claimed is:

1. In a tool head for a machine tool including a tool slide base, a tool slide on the tool slide base, and rotatable means operable to move the tool slide relative to the tool slide base, a releasable restraining mechanism comprising a pair of opposed coiled members, each having a free end and an opposite end held against rotation, said coiled members being self-biased into gripping engagement with the rotatable means and collectively effective by means of their self-biased engagement with the rotatable means to secure the rotatable means against rotation in either direction, and means to engage both of said free ends of said coiled members to unwind both of said coiled members out of engagement with the rotatable means, thereby allowing rotation of the rotatable means.

2. In a tool head for a machine tool having a tool slide base, a tool slide slidably supported on the tool slide base, and rotatable tool slide traversing means, a releasable restraining mechanism comprising a pair of opposed fully compressed coiled members, each having a free end with a projecting portion and an opposite end anchored against rotary displacement, said coiled members surrounding and radially self-biased into frictional engagement with the rotatable tool slide traversing means and collectively effective by means of their self-biased engagement with the rotatable tool slide traversing means to secure the rotatable tool slide traversing means against rotation in either direction, and means selectively operable to engage both of said free and projecting portions of said coiled members to radially expand both of said coiled members out of engagement with the rotatable tool slide traversing means, thereby allowing rotation of the rotatable tool slide traversing means.

3. In a tool head for a machine tool having a tool slide base, a tool slide on the tool slide base, and traversing means including a rotatable member to move the tool slide relative to the tool slide base, a releasable restricting mechanism comprising a pair of coiled members, each having one free end and one end anchored to the tool slide, said coiled members being wound in opposite directions and radially self-biased so that the internal surfaces of said coiled members fricitionally engage the rotatable member to secure the rotatable member against rotation in either direction solely by coaction of the self-biased coiled members, and means to engage the free ends of both of said coiled members to radially expand the internal surfaces of both of said coiled members out of engagement with the rotatable member to allow rotation of the rotatable traversing means.

4. In a tool head for a machine tool including a tool slide base, a tool slide slidably supported on the tool slide base, and rotatable tool slide traversing means, a releasable restraining mechanism comprising a pair of opposed coiled members, each having a free end with a projecting portion and an opposite end anchored to the tool slide, said coiled members surrounding and self-biased radially into frictional engagement with the rotatable tool slide traversing means and collectively effective by their self-biased engagement with the rotatable tool slide traversing means to secure the rotatable tool slide traversing means against rotation in either direction, and actuating means rotatable between first and second limit positions and disposed in interfitting engagement with the free end projecting portions of both of said coiled members, said actuating means being operable as it is moved to its first position to radially expand both of the said coiled members out of engagement with the rotatable tool slide traversing means to allow rotation of the rotatable tool slide traversing means, and operable as it is moved to its second position to displace the free and projecting portions so as to assist in restoration of the frictional engagement between both of said coiled members and the rotatable tool slide traversing means.

References Cited in the file of this patent

UNITED STATES PATENTS

| | | |
|---|---|---|
| 1,304,882 | Johnson | May 27, 1919 |
| 2,388,699 | Morrill | Nov. 13, 1945 |
| 2,687,188 | Courtois | Aug. 24, 1954 |